United States Patent
Nitta et al.

(10) Patent No.: US 6,363,208 B2
(45) Date of Patent: *Mar. 26, 2002

(54) DIGITAL SIGNAL REPRODUCTION METHOD AND APPARATUS

(75) Inventors: Hajime Nitta; Akira Hasegawa, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,227

(22) Filed: Mar. 10, 1998

(30) Foreign Application Priority Data

Mar. 19, 1997 (JP) ............................. 9-067071

(51) Int. Cl.[7] ............................... H04N 5/928
(52) U.S. Cl. .......................... 386/75; 386/95
(58) Field of Search ................. 386/46, 68, 95, 386/111, 112, 125, 126, 75, 105, 104; 369/58; H04N 5/928

(56) References Cited

U.S. PATENT DOCUMENTS 5,596,564 A * 1/1997 Fukushima et al. ........... 386/95
5,787,225 A   7/1998 Honjo ......................... 386/105
5,899,577 A * 5/1999 Fujisaki et al. ............... 386/68
5,937,138 A * 8/1999 Fukuda et al. ............... 386/112
5,963,703 A * 10/1999 Higurashi et al. ............ 386/75
6,104,684 A * 8/2000 Moriyama et al. ........... 369/58
6,118,927 A * 9/2000 Kikuchi et al. .............. 386/95

FOREIGN PATENT DOCUMENTS

| EP | 0 650 296 | 4/1995 |
| EP | 0 668 697 | 8/1995 |
| EP | 0 676 895 | 10/1995 |
| EP | 0 738 078 | 10/1996 |
| JP | 06 339117 | 12/1994 |

* cited by examiner

Primary Examiner—Huy Nguyen
(74) Attorney, Agent, or Firm—Frommer Lawrence & Haug LLP; William S. Frommer; Bruno Polito (57) ABSTRACT

A system and method for performing high-speed reproduction of compressed video/audio data. High-speed reproduction is controlled such that only a portion of the data contained in each of the smallest possible data reproduction units is reproduced, and such that only the portion of the audio data which is contained in each of the smallest possible data reproduction units is reproduced.

10 Claims, 5 Drawing Sheets

DIGITAL SIGNAL REPRODUCTION METHOD AND APPARATUS

BACKGROUND OF THE INVENTION

1. Field of the Invention

The present invention relates to a digital signal reproduction method and apparatus for reproducing a digital signal in which a digital audio signal and a digital video signal are multiplexed and in particular, to a digital signal reproduction method and apparatus preferable for a high-speed reproduction including a double-speed reproduction of a digital signal recorded on a recording medium.

2. Description of the Prior Art

A so-called digital video disc (hereinafter, referred to as a DVD) is known as a recording medium such as an optical disc on which a digital video signal, a digital audio signal, and the like are recorded.

In the DVD format, a cell is used as a basic unit for reproducing contents of an information. This cell further consists of video object units (VOBU) of 0.4 to 1.2 second reproduction unit which is the smallest reproduction unit. At the head of this smallest reproduction unit VOBU is arranged a navigation pack (NV_PCK) which is a control information pack. This NV_PCK contains a presentation control information (PCI) and a data search information (DSI). These information items are used, for example, as the VOBU address information for scanning before and after the aforementioned smallest reproduction unit VOBU.

Figure 1:
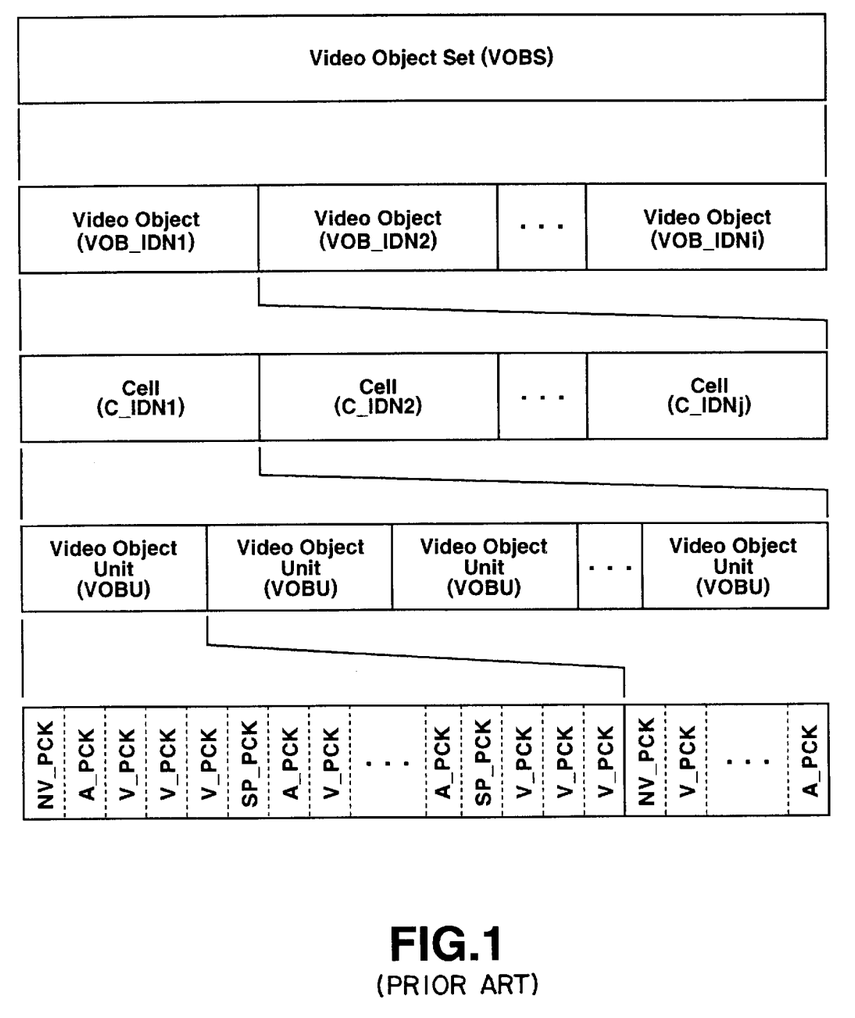
FIG. 1 shows a data configuration of the DVD format.

Here, FIG. 1 shows a data configuration of the aforementioned DVD format. As shown in FIG. 1, a video object set (VOBS) unit is used for management of a main video data, a sub-video data, and an audio data. This VOBS, for example, corresponds to one movie work. This VOBS consists of a plurality of video objects (VOB). The VOB is a unit of a group of data recorded on a disc. The VOB consists of a plurality of cells. The cell corresponds to, for example, one scene or one cut of a movie. Moreover, the DVD has a multi-story format offering one movie in plurality of story arrangements and a parental lock function for skipping an undesirable scene such as a violence scene. These functions are created by combination of the cells.

One cell consists of a plurality of video object units (VOBU). The VOBU corresponds to 0.4 to 1.2 seconds in a moving picture and this VOBU contains, for example, one GOP (group of pictures) in the so-called MPEG format. It should be noted that the MPEG is a hybrid data compression specification using the motion compensative predictive coding and the discrete cosine transform (DCT) in combination which has been discussed and suggested by the ISO-IEC/JTC1/SC2/WG11. The GOP (group of pictures) of the MPEG specification contained in a VOBU includes an intra-frame coding picture (I picture), a forward frame-to-frame predictive coding picture (P picture), and a bidirectional frame-to-frame predictive coding picture (B picture).

Figure 2A:
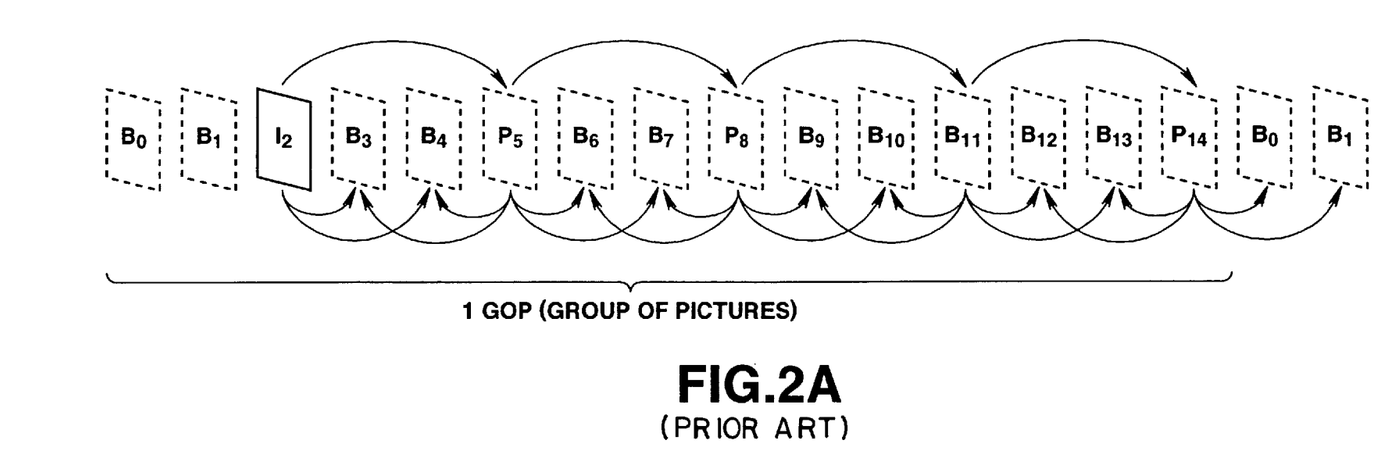
FIG. 2 shows a configuration of a frame-to-frame prediction and a recording frame configuration in the MPEG specification.

FIG. 2A shows a configuration example of a frame-to-frame prediction in the MPEG method in a case when one GOP consists of, for example, 15 frames.

In FIG. 2A, the I picture is an intra-frame coding picture which has been subjected to a predictive coding within one frame; the P picture is a forward frame-to-frame coding picture which predicts referencing a temporally preceding frame (I picture or P picture) which has been coded; and the B picture is a bidirectional predictive coding picture which predicts referencing two frames, i.e., temporally preceding and following pictures.

That is, as shown by the arrows in the figure, the I picture $I_2$ is coded with prediction within the frame; the P picture $P_5$ is coded with prediction referencing the I picture $I_2$; and the P picture $P_8$ is coded with prediction referencing the P picture $P_5$. Furthermore, the B pictures $B_3$ and $B_4$ are coded each referencing two pictures, i.e., I picture $I_2$ and P picture $P_5$; and the B pictures $B_6$ and $B_7$ are coded each referencing two pictures, i.e., P picture $P_5$ and P picture $P_8$. Thus, predictive coding is carried out for creating the remaining pictures. It should be noted that the subscript in each of the pictures represents a temporary reference (hereinafter, referred to as TR). Here, the TR indicates the picture sequence in the GOP and during a normal picture reproduction, the frames are reproduced in this TR sequence.

When decoding these pictures which have been predictive-coded, various pictures are required depending on the picture type. The I pictures which have been coded with prediction within a frame can be decoded with the I pictures alone. However, the P pictures which have been coded referencing a temporally preceding I picture or P picture require the temporally preceding I picture or P picture for decoding. The B pictures which have been coded referencing temporally preceding and following I picture or P picture require the temporally preceding and following I picture or P picture for decoding.

Figure 2B:
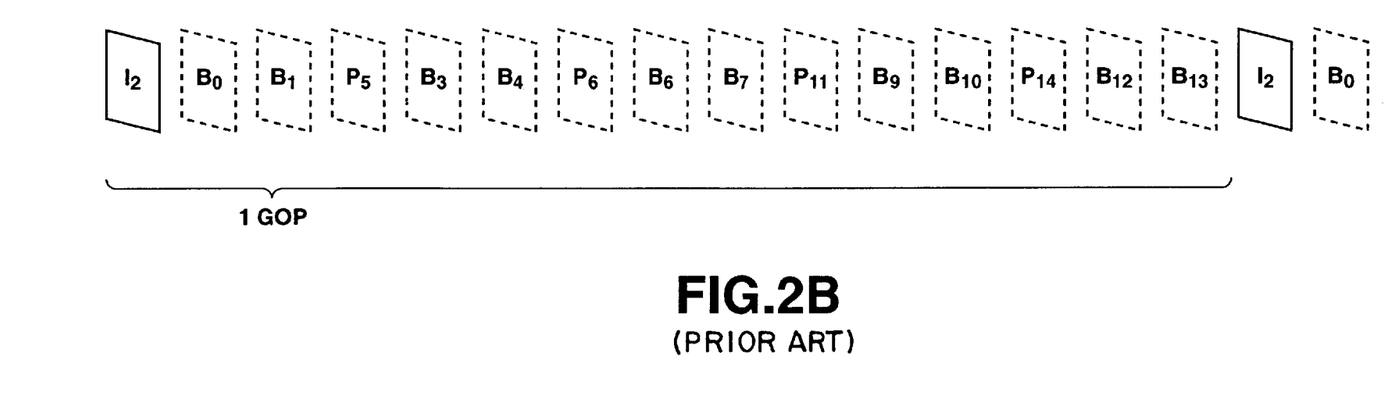

In order that those pictures required for decoding can be decoded in advance, the pictures are rearranged as shown in FIG. 2B. That is, the B pictures $B_0$ and $B_1$, during decoding, require an I picture or P picture of the preceding GOP and the I picture $I_2$ and accordingly, the I picture $I_2$ is arranged prior to the B pictures $B_0$ and $B_1$. The B pictures $B_3$ and $B_4$, during decoding, require the I picture $I_2$ and the P picture $P_5$ and accordingly, the P picture $P_5$ is arranged prior to the B pictures $B_3$ and $B_4$. The B pictures $B_6$ and $B_7$, during decoding, require the P pictures $P_5$ and $P_8$ and accordingly, the P picture $P_8$ is arranged prior to the B pictures $B_6$ and $B_7$. The B pictures $B_9$ and $B_{10}$, during decoding, require the P pictures $P_8$ and $P_{11}$ and accordingly, the P picture $P_{11}$ is arranged prior to the B pictures $B_9$ and $B_{10}$. The B pictures $B_{12}$ and $B_{13}$, during decoding, require the P pictures $P_{11}$ and $P_{14}$ and accordingly, the P picture $P_{14}$ is arranged prior to the B pictures $B_{12}$ and $B_{13}$. Thus, in the MPEG method, the decoding order is different order is different from the presentation order of the pictures displayed.

Back to FIG. 1, one VOBU (video object unit) consists of: a navigation pack NV_PCK which is a control data pack containing the VOBU management information and the like; a video pack V_PCK containing a main video data; an audio pack A_PCK containing an audio data; and a sub-picture pack SP-PCK containing a sub-audio data. The V_PCK, A_PCK, and SP_PCK are respectively compressed according to a format such as MPEG2 and recorded on a recording medium, i.e., an optical disc.

Figure 3:
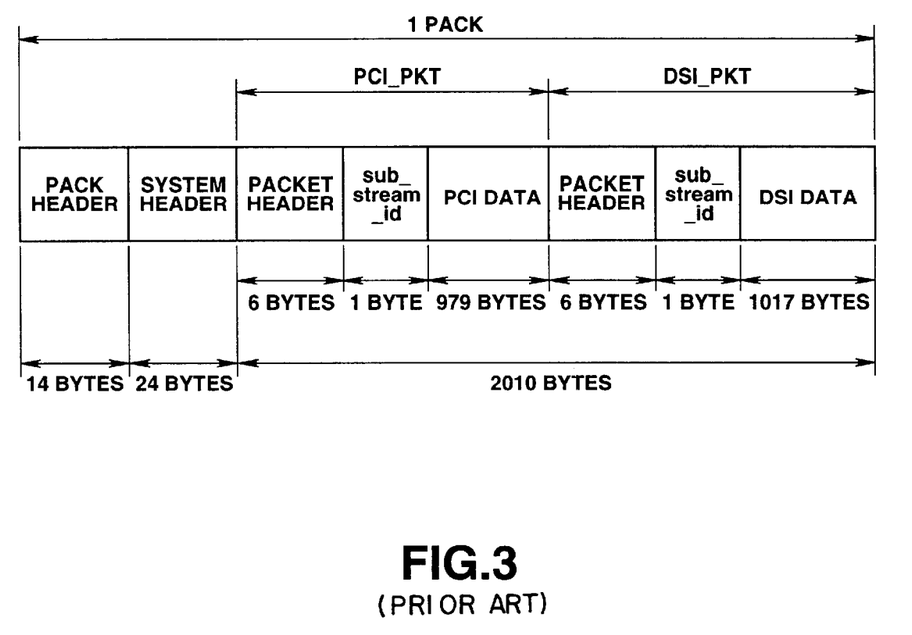
FIG. 3 shows a configuration of the navigation pack (NV_PCK).

FIG. 3 shows a configuration of the navigation pack NV_PCK which is a control data pack arranged at the head of a VOBU. As shown in this FIG. 3, the NV_PCK has a pack header and a system header which is followed by a PCI (presentation control information) packet containing a PCI data and a DSI (data search information) packet containing a DSI data.

Furthermore, the DSI data contains DSI-GI (not depicted) which is a general information of the DSI. This DSI_GI contains the end addresses of the reference pictures (I pictures and P pictures) of each picture in the aforementioned MPEG. More specifically, the DSI_GI contains a data on the end address of the first reference picture (I picture) in the VOBU VOBU_1STREF_EA, the end address of the second reference picture (the first P picture) in the VOBU VOBU_2NDREF_EA, and the end address of the third reference picture (the second P picture) in the VOBU VOBU_3RDREF_EA.

When carrying out a forward or backward high-speed reproduction such as double-speed reproduction, if only the pictures of the addresses obtained from the aforementioned NV-PCK are reproduced, there often arises a difficulty for a user of the reproduction apparatus to find a target picture during scan of a scene containing no persons or scene containing no moving objects.

SUMMARY OF THE INVENTION

It is therefore an object of the present invention to provide a digital signal reproduction method and apparatus capable of simultaneously reproducing a video data and an audio data at a high-speed reproduction so as to facilitate search not only by the video information but by the audio information.

In order to achieve the aforementioned object, the present invention is characterized in that when reproducing a digital signal containing a plurality of signal types including an audio signal multiplexed in blocks as the smallest reproduction unit, at a higher speed than a standard reproduction speed, an audio signal corresponding at least a part of the area in the aforementioned smallest reproduction unit is successively reproduced.

The aforementioned digital signal contains a compressed video signal which has been compression-coded by way of predictive coding in the time axis direction. During a high-speed reproduction, at least a part of reference pictures of the compressed video signal in the smallest reproduction unit alone are successively reproduced. Simultaneously with this, it is preferable that an audio signal corresponding to a continuous area containing the aforementioned part of reference pictures in the smallest reproduction unit be successively reproduced or, if the smallest reproduction unit does not contain a predetermined picture data of the compressed video signal, an audio signal corresponding to approximately half area of the smallest reproduction unit be successively reproduced.

Here, the aforementioned smallest reproduction unit is, for example, a VOBU (video object unit) in the so-called DVD format. The aforementioned continuous area is a continuous area containing the aforementioned part of reference pictures as well as pictures sandwiched by these reference pictures. The aforementioned reference pictures are pictures which are referenced during predictive coding in the time axis direction, and more specifically, an intra-frame prediction-coded picture (I picture) and frame-to-frame forward direction predictive coding picture (P picture). Moreover, the predetermined picture data is, more specifically, the data on the first, second, and third reference pictures in the VOBU. When the data on the third reference picture is missing, an audio data in half area of the VOBU is read out to be reproduced.

Thus, during a high-speed reproduction, a video signal in a part of area of the smallest reproduction unit is reproduced together with an audio signal of that part of area, so as to enable to search not only by the picture information but also by audio information.

DETAILED DESCRIPTION OF THE PREFERRED EMBODIMENTS

Description will now be directed to preferred embodiments of the present invention.

FIG. 4 is a time chart for explanation of a digital signal reproduction method according to an embodiment of the present invention.

Figure 4A:
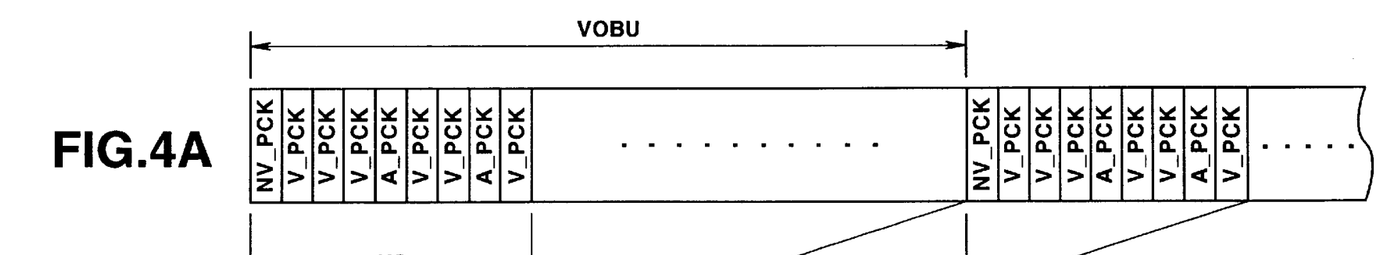
FIG. 4 is a time chart for explanation of the operation of an embodiment of the present invention.

FIG. 4A shows a data obtained during a standard speed reproduction, i.e., a normal reproduction. The aforementioned smallest reproduction unit VOBU starts with a navigation pack (NV_PCK) which is a control data pack followed by a plurality of packs such as a video pack (V_PCK) and an audio pack (A_PCK). When carrying out a high-speed reproduction at a higher speed than the standard reproduction speed such as a double-speed reproduction, among the reference pictures (I pictures and P pictures) in one GOP of the MPEG specification consisting of a plurality of video packs (V_PCK) in one VOBU, only a part of the reference pictures is reproduced. For example, Japanese Patent Application Hei 7-32944 filed by the applicant of the present invention discloses through the Specification and the drawings a technique of reproducing one I picture and two P pictures appearing after the I picture within one GOP and then the following GOP so as to realize a high-speed reproduction. Here, for example, it is assumed that a video data in one VOBU corresponds to one GOP consisting of one frame of I picture, four frames of P picture, and 10 frames of B picture.

Here, according to the embodiment of the present invention, within one VOBU, a continuous range containing a plurality of video packs (V_PCK) necessary for reproducing the aforementioned one I picture and the two P pictures after this I picture in the video data is defined as an HS area at the beginning of the VOBU, and an audio signals contained in the audio packs (A_PCK) contained in this HS area are successively reproduced.

Figure 4B:
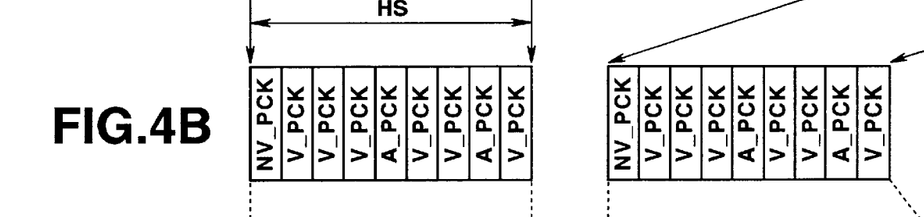
Figure 4C:
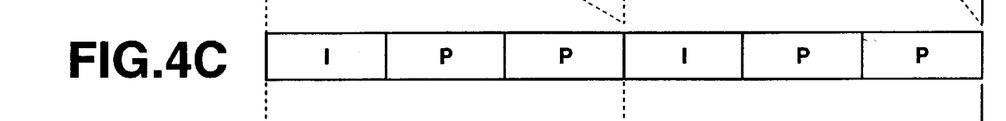
Figure 4D:
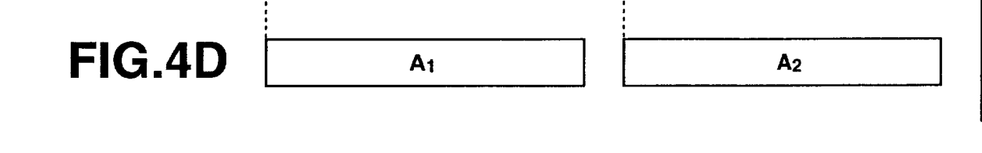

That is, when reading a digital signal from a recording medium capable of random access such as a DVD, digital signals in the HS area corresponding to the aforementioned three reference pictures (one I picture and two P pictures) within one VOBU having the recording contents as shown in FIG. 4A are read in as shown in FIG. 4B and decoded by using the data of the aforementioned three reference pictures in the video data of the video packs IB_PCK) in this HS area, so that the one I picture and the two P pictures are reproduced and displayed as shown in FIG. 4C. Simultaneously with this, the audio signals in the audio packs (A_PCK) found in the HS area are successively reproduced as shown in FIG. 4D.

It should be noted that if no video data is present in the aforementioned VOBU (for example, in a case of a still picture reproduction), or if no video data exists for the third reference picture of the aforementioned three reference pictures, audio signals of the audio packs (A_PCK) contained in a predetermined area of the one VOBU, for example, in about half area of the VOBU, are successively reproduced.

Figure 5:
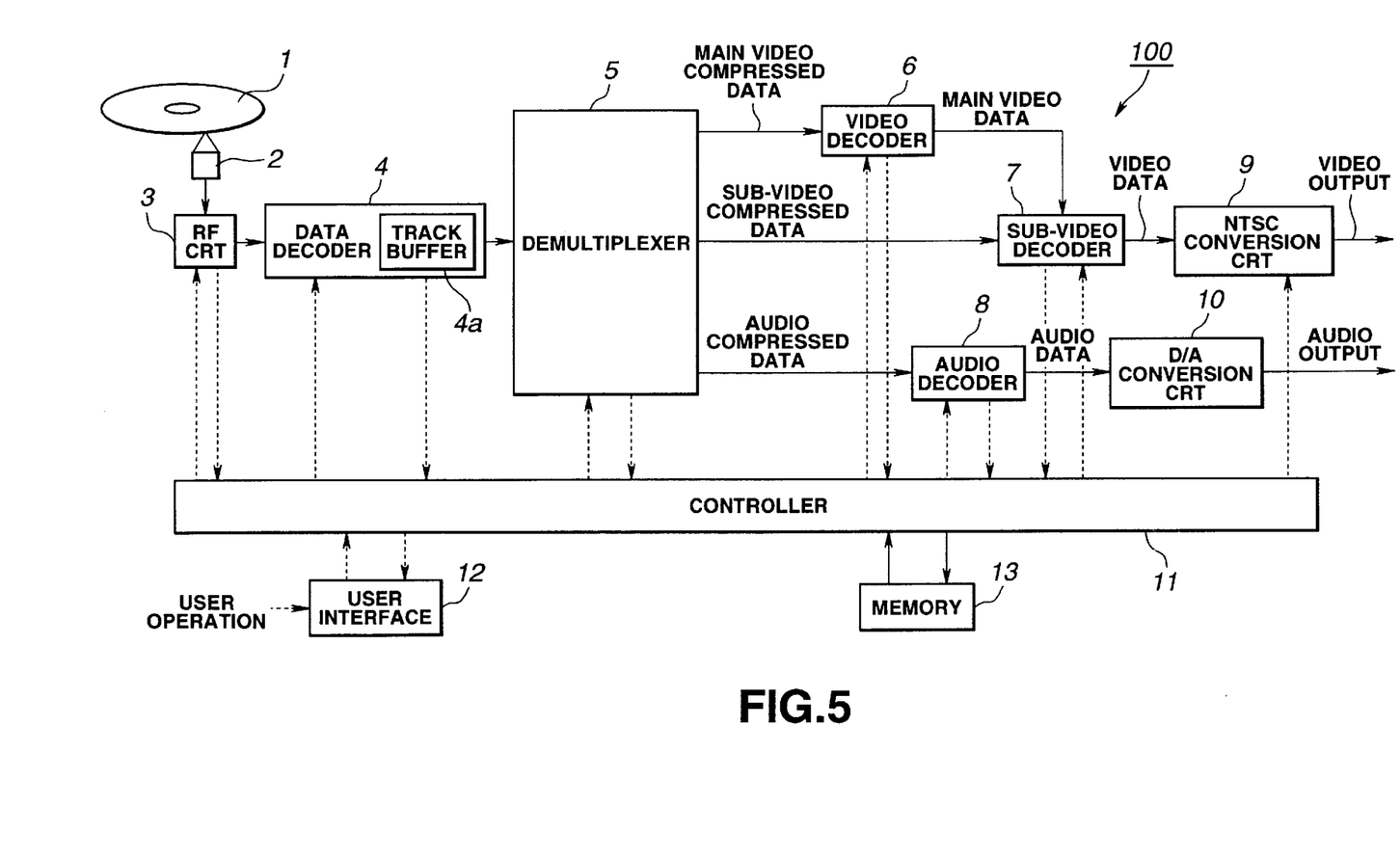
FIG. 5 is a block diagram showing a basic configuration of a DVD (digital video disc) reproduction apparatus according to the embodiment of the present invention.

Description will now be directed to a circuit configuration for realizing the audio signal reproduction operation during the aforementioned high-speed reproduction with reference to FIG. 5. FIG. 5 is a block diagram of a digital video disc (DVD) reproduction apparatus.

FIG. 5 shows a DVD reproduction apparatus 100 including: a pickup 2 for reproducing an RF signal from a recording medium (optical disc) 1; an RF circuit 3 supplied with the RF signal reproduced by this pickup 2, so as to be subjected to a binarization processing; a data decoder 4 supplied with a reproduction data from the RF circuit 3 so as to be subjected to a decoding processing such as an error correction; and a demultiplexer 5 which is supplied with the reproduction data decoded by the data decoder 4 and divides the data into a main video compressed data, sub-video compressed data, and an audio compressed data.

This DVD reproduction apparatus 100 further includes: a video decoder 6 for spreading the aforementioned main video compressed data; a sub-video decoder 7 for spreading the aforementioned sub-video compressed data and combining the resultant data with the main video data; an audio decoder 8 for spreading the aforementioned audio compressed data; a digital/NTSC PAL conversion circuit 9 (hereinafter, referred to simply as NTSC conversion circuit) which is supplied with the video data of the main video data in combination with the sub-video data from the sub-video decoder 7 and coverts the data into an NTSC signal or a PAL signal; and a digital/analog conversion circuit 10 (hereinafter, referred to simply as a D/A conversion circuit) for converting the audio data from the audio decoder 8, into an analog signal.

Moreover, this DVD reproduction apparatus 100 includes: a controller 11 for controlling the pickup 2, the RF circuit 3, the data decoder 4, the demultiplexer 5, the video decoder 6, the sub-video decoder 7, the audio decoder 8, the NTSC conversion circuit 9, and the D/A conversion circuit 10; a user interface 12 for interfacing between this controller 11 and the user operation inputs; and a memory 13 for storing data of the controller 11.

The DVD reproduction apparatus 100 reproduces a DVD disc and a DVD-VIDEO disc including discs dedicated for reproduction, writable discs, and rewritable discs.

The pickup 2 reproduces an RF signal from the recording medium 1 and supplies the RF signal to the RF circuit 3.

The RF circuit 3 carries out waveform equalization and binarization to this RF signal and creates a digital signal and its synchronization signal. The digital data and others created by this RF circuit 3 are supplied to the data decoder 4.

According to the digital data created by the RF circuit 3, the data decoder 4 carries out decoding of the data and data correction. The digital data decoded and corrected by the data decoder 4 is supplied to the demultiplexer 5.

Moreover, this data decoder 4 also detects a system header in the MPEG2 format, a parameter information contained in the pack header, a predetermined information contained in the navigation pack (NV_PCK) in the DVD format. The parameter information and other data detected are supplied from the data decoder 4 to the controller 11.

Moreover, this data decoder 4 has a track buffer 4a at the output stage of a digital data. This track buffer 4a absorbs the difference in processing speed between the data decoder 4 and the demultiplexer 5.

In the demultiplexer 5, the digital data which has bee subjected to decoding including error corrections by the data decoder 4 is divided into a main video compressed data, a sub-video compressed data, and an audio compressed data.

here, the main video compressed data is a video data which has been compressed by the MPEG2 method, for example, Video streams in the DVD format. The sub-video compressed data is a data such as a superimposed dialog combined with the main video data, for example, Sub-picture streams in the DVD format. The audio compressed data is an audio data which has been compressed by the MPEG2 method, i.e., Audio streams in the DVD format.

The demultiplexer 5 supplies the main video compressed data to the video decoder 6, the sub-video compressed data to the sub-video decoder 7, and the audio compressed data to the audio decoder 8.

The video decoder 6 carries out decoding of the main video compressed data and creates a main video data spread by this decoding processing. This video decoder 6 has a memory for three frames for use in decoding. That is, the aforementioned I picture, P picture, and B picture in the MPEG2 format are decoded and stored in the memory of the video decoder 6. Furthermore, the pictures decoded are outputted from this memory. This memory may have a capacity more than for the three frames. The video decoder 6 supplies the main video data created to the sub-video decoder 7.

The sub-video decoder 7 carries out decoding of the sub-video compressed data and combines the sub-video data decoded with the main video data supplied from the video decoder 6, so as to create a video data. That is, the sub-video decoder 7 combines the superimposed image reproduced as the sub-video data with the main video data. It should be noted that if no sub-video data is present, this sub-video decoder 7 outputs the main video data as it is. The sub-video decoder 7 supplies the video data created to the NTSC conversion circuit 9.

The audio decoder 8 carries out decoding of the audio compressed data and creates an audio data spread. That is, if the audio compressed data has been compressed by the MPEG2 format, the audio decoder 8 carries out the corresponding spread processing and creates an audio data. It should be noted that if the audio data has been coded by a format such as PCM other than the MPEG2, the corresponding decoding is carried out. The audio decoder 8 supplies the audio data created to the D/A conversion circuit 10.

The NTSC conversion circuit 9 converts the video data from a digital data into a television signal such as an NTSC or PAL for output. This output is supplied to a monitor and the like so that the user can view and hear the video data reproduced from the recording medium 1.

The D/A conversion circuit 10 converts the audio data which is a digital data, into an analog audio data for output. This output is supplied to a speaker and the like so that the user can view and hear the video data reproduced from the recording medium 1.

The controller 11 carries out control over the pickup 2, the RF circuit 3, the data decoder 4, the dmultiplexer 5, the video decoder 6, the sub-video decoder 7, the audio decoder 8, the NTSC conversion circuit 9, and the D/A conversion circuit 10. Moreover, this controller 11 is supplied with an operation input through the user interface 12 such as an operation panel and a remote controller. According to the operation input, the controller 11 controls the corresponding circuit. Moreover, the controller 11 makes to store various control data in the memory 13 and carries out various control according to the data stored in the memory 13.

During the aforementioned high-speed reproduction, a data from the VOBU address reproduced on the recording medium 1 is supplied via the pickup 2, the RF circuit 3, and the data decoder 4, to the demultiplexer 5. The data decoder 4 can obtain from the DSI (data search information) of the aforementioned control information pack NV_PCK, the end address containing a video pack (V_PCK) corresponding to the aforementioned three reference pictures (I picture and the corresponding two P pictures), i.e., the address of the third reference picture (VOBU_3RDREF_EA), and makes to output to the demultiplexer 5, only a data up to this third reference picture address (VOBU_3RDREF_EA) for each VOBU.

However, if the end addresses (VOBU_1STREF_EA, VOBU_2NDREF_EA, VOBU_3RDREF_EA) of the I picture and P picture obtained from the DSI of the aforementioned NV_PCK are all zero, or if the end address of the third reference picture, i.e., VOBU_3RDREF_EA is zero, a data up to the half of the VOBU end address is outputted, so as to output an audio data.

The controller 11 obtains the information of the aforementioned NV_PCK. The main compressed data (video data) following the NV_PCK is transmitted to the video decoder 6. The controller 11 makes the video decoder 6 decode only the aforementioned three reference pictures (I picture and P picture).

During a forward high-speed reproduction, i.e., so-called forward scan, each of the reference pictures decoded is successively displayed. Moreover, the audio data is transmitted to the audio decoder 8. The audio decoder 8 decodes a compressed audio data while storing the data in a code buffer at the input stage. A digital audio signal decoded is converted by the D/A conversion circuit 10 into an analog audio signal for output.

During a backward high-speed reproduction, i.e., so-called backward scan, the aforementioned three reference pictures are all decoded and they are displayed in the backward order different from the decoding order at the moment when the video decoder 6 is supplied with a main video compressed data of the next VOBU. The audio data is decoded in the same way as in the aforementioned forward scan. The data which has passed through the demultiplexer 6 is decoded as it is and is outputted.

Here, a memory is provided for buffering an input data between the demultiplexer 5 and the audio decoder 6, or at the input stage of the audio decoder 8. This memory preferably has a capacity larger than an advanced value (for example, 4 kbytes) so that the main video scan speed is not affected in both of the forward scan and the backward scan.

For example, in a case when a video data is coded by the MPEG specification M=3, two B pictures are present between the reference pictures (I and P pictures). In this case, the buffer memory preferably has a capacity for four frames (4/30 seconds in the NTSC) or more, so as to skip a total of four pictures and decode I, P, P as fast as possible.

Thus, by storing compressed audio data pieces in the audio code buffer for decoding and reproducing, it is possible to reproduce an audio data of a long time even if the data is supplied intermittently.

It should be noted that the present invention is not limited to the aforementioned embodiment. For example, the number of the reference pictures reproduced during the high-speed reproduction is not limited to three.

As is clear from the aforementioned, according to the present invention, when reproducing at a high speed a digital signal consisting of a plurality of digital signal types including an audio signal multiplexed on the block basis for each of the smallest reproduction unit, an audio signal corresponding at least a part of the aforementioned smallest reproduction unit is successively reproduced, which enables to reproduce an audio signal simultaneously with other digital signal during the high-speed reproduction.

The aforementioned digital signal includes a compressed video signal which has been subjected to a compression coding by way of predictive encoding in the temporal axis direction. During a high-speed reproduction, only the reference pictures of at least a part of the compressed video signal within the aforementioned smallest reproduction unit are successively reproduced, and simultaneously with this, an audio signal corresponding to a continuous area containing the reference pictures of the aforementioned part within the aforementioned smallest reproduction unit is successively reproduced, so that during a high-speed reproduction of a video signal, a corresponding audio signal is reproduced simultaneously, which enables retrieval according to the audio information in addition to the video information, thus facilitating to search a target.

Moreover, if the aforementioned smallest reproduction unit does not contain a predetermined video data of the aforementioned compressed video signal, an audio signal corresponding to approximately half of the smallest reproduction unit is successively reproduced, enabling to search a target according to the audio information even if a still picture is displayed.

Furthermore, an audio code buffer is used to store compressed audio data pieces for decoding and reproduction, so that an audio data of a long time can be reproduced even if the data is supplied intermittently.

What is claimed is:

1. A digital signal reproduction apparatus comprising:
   reproduction means for reproducing a digital signal in which a plurality of digital signal types including an audio signal and data search information are multiplexed and recorded in blocks as the smallest reproduction unit;
   control means for controlling said reproduction means according to said data search information, during a high-speed reproduction, to reproduce predetermined reference pictures and data contained in a portion of said smallest reproduction unit which is less than the whole of said smallest reproduction unit; and
   audio reproduction means for successively reproducing, during said high-speed reproduction, a portion of said audio signal contained in said portion of said smallest reproduction unit.

2. A digital signal reproduction apparatus as claimed in claim 1, wherein said digital signal contains a prediction-coded video signal; said portion of said smallest reproduction unit is a continuous area containing at least one predictive-coded video signal to be displayed; and there is further provided video reproduction means for successively reproducing said prediction-coded video signal in said digital signal controlled to be reproduced by said control means.

3. A digital signal reproduction apparatus as claimed in claim 2, wherein said predictive-coded video signal contains one intra-frame prediction-coded video signal and at least one frame-to-frame prediction-coded video signal, and said portion of said smallest reproduction unit is a continuous area containing an intra-frame prediction-coded video signal and at least one frame-to-frame prediction-coded signal which are to be displayed.

4. A digital signal reproduction apparatus as claimed in claim 1, wherein said digital signal contains at least one prediction-coded video signal, and said portion of said audio signal reproduced by said audio reproduction means is contained in approximately one half of said smallest reproduction unit when said digital signal controlled to be reproduced by said control means contains no prediction-coded video signal to be displayed.

5. A digital signal reproduction apparatus as claimed in claim 2, wherein said digital signal contains a position information indicating said portion of said smallest reproduction unit, and said control means, according to said position information, controls to reproduce a data contained in said part of area in said smallest reproduction unit of said digital signal.

6. A digital signal reproduction method for reproducing a digital signal in which a plurality of digital signal types including an audio signal and data search information are multiplexed and recorded in blocks as the smallest reproduction unit on a recorded medium, said method comprising the steps of:

performing a high-speed reproduction of said digital signal via a reproduction means; and controlling said reproduction means according to said data search information, during said high-speed reproduction, to reproduce predetermined reference pictures and data contained in a portion of said smallest reproduction unit which is less than the whole of said smallest reproduction unit, so as to successively reproduce a portion of said audio signal contained in said portion of said smallest reproduction unit.

7. A digital signal reproduction method as claimed in claim 6, wherein said digital signal contains a prediction-coded video signal; said portion of said smallest reproduction unit is a continuous area containing at least one predictive-coded video signal to be displayed, said method further comprising a step of successively reproducing said prediction-coded video signal in said digital signal controlled to be reproduced.

8. A digital signal reproduction method as claimed in claim 7, wherein said predictive-coded video signal contains one intra-frame prediction-coded video signal and at least one frame-to-frame prediction-coded video signal, and said portion of said smallest reproduction unit is a continuous area containing an intra-frame prediction-coded video signal and at least one frame-to-frame prediction-coded signal which are to be displayed.

9. A digital signal reproduction method as claimed in claim 6, wherein said digital signal contains at least one prediction-coded video signal, and said portion of said audio signal reproduced is contained in approximately one half of said smallest reproduction unit when said digital signal controlled to be reproduced by a control means in the controlling step contains no prediction-coded video signal to be displayed.

10. A digital signal reproduction apparatus as claimed in claim 7, wherein said digital signal contains a position information indicating said portion of said smallest reproduction unit, and said control step includes a step for controlling, according to said position information, to reproduce a data contained in said part of area in said smallest reproduction unit of said digital signal.

* * * * *